United States Patent
Rawlings

(10) Patent No.: US 7,244,912 B1
(45) Date of Patent: Jul. 17, 2007

(54) VEHICULAR MIRROR WITH HEATER CIRCUIT MODULE

(75) Inventor: Don S. Rawlings, Caledonia, MI (US)

(73) Assignee: Magna Donnelly Mirrors North America, L.L.C., Kentwood, MI (US)

( * ) Notice: Subject to any disclaimer, the term of this patent is extended or adjusted under 35 U.S.C. 154(b) by 0 days.

(21) Appl. No.: 10/711,349

(22) Filed: Sep. 13, 2004

Related U.S. Application Data

(60) Provisional application No. 60/481,360, filed on Sep. 11, 2003.

(51) Int. Cl.
*B60R 1/12* (2006.01)
*H05B 3/83* (2006.01)

(52) U.S. Cl. .................................. 219/219; 219/522

(58) Field of Classification Search ............... 219/202, 219/203, 219, 522, 544, 548; 359/265, 871
See application file for complete search history.

(56) References Cited

U.S. PATENT DOCUMENTS 5,808,777 A * 9/1998 Lynam et al. ............... 359/265
6,247,823 B1 * 6/2001 Fuerst et al. ................ 359/871
6,426,485 B1 * 7/2002 Bulgajewski et al. ....... 219/219
6,650,457 B2 * 11/2003 Busscher et al. ............ 359/265
6,657,767 B2 * 12/2003 Bonardi et al. ............. 359/265
6,669,267 B1 * 12/2003 Lynam et al. ............. 296/146.5
6,969,101 B2 * 11/2005 Lynam et al. ............... 296/1.11

FOREIGN PATENT DOCUMENTS

DE 29915896 U1 * 12/1999
GB 2 250 406 A 3/1992

* cited by examiner

*Primary Examiner*—Joseph Pelham
(74) *Attorney, Agent, or Firm*—McGarry Bair PC

(57) ABSTRACT

A vehicular mirror system includes an exterior mirror assembly having a reflective element for providing a rearward view to an occupant of a vehicle and a power distributor for distributing power from a single electrical power connector to a plurality of functional elements associated with the reflective element. The power distributor has a plurality of electrical leads corresponding to each functional element of the plurality of functional elements; the plurality of functional elements includes at least two functional elements selected from the group consisting of a dimming device, a heater and a turn signal. The power distributor has at least one power lead for operative connection of the power distributor to an onboard power supply of the vehicle.

13 Claims, 6 Drawing Sheets

VEHICULAR MIRROR WITH HEATER CIRCUIT MODULE

CROSS-REFERENCE TO RELATED APPLICATION

This application claims the benefit of U.S. provisional application Ser. No. 60/481,360, filed Sep. 11, 2003, which is incorporated herein by reference in its entirety.

FIELD OF THE INVENTION

The invention relates to a vehicular rearview mirror system. In one aspect, the invention relates to a modular heating and power supply panel for providing power to a rearview mirror system incorporating several powered functions.

DESCRIPTION OF THE RELATED ART

Externally-mounted rearview mirror assemblies are ubiquitous for contemporary motor vehicles. Such mirror assemblies have long been used to aid the driver in operating the vehicle, especially in improving the driver's rearward view. Contemporary rearview mirror assemblies increasingly incorporate enhanced functionality in addition to image reflection, such as turn signal indicators, automatic dimming capabilities, and heating/defogging elements.

The functional elements, e.g. turn signals and heating/defogging elements, incorporated into the mirror assembly are typically powered and controlled by the vehicle's power supply and control systems. This necessitates separate power and control feeds to each functional element, which typically comprise separate wire harnesses. As well, each functional element typically comprises a distinct structural component which must be assembled into the finished mirror assembly. Assembly of the various functional elements and their associated power and control feeds can thus be complicated, particularly as the number and complexity of the functional elements increases. It is frequently necessary to simultaneously assemble several components into the mirror assembly, while ensuring that the components are in the proper positional relationship, and their power and control feeds are properly interconnected. Improper assembly of the components can result in a mirror assembly that does not perform properly. Difficulty with achieving proper assembly, and the frequency of defective assemblies, contribute to an increase in the cost of such mirror assemblies.

SUMMARY OF THE INVENTION

A vehicular mirror system comprises a base adapted to be mounted to a vehicle, and a mirror assembly. The mirror assembly includes a reflective element carrier mounted to the base, a reflective element associated with the reflective element carrier for providing a rearward view to an occupant of the vehicle, and a power distributor operatively interconnected with the reflective element for distributing power from a single electrical power connector to a plurality of functional elements associated with the reflective element. The power distributor can further comprise a support member disposed between the reflective element carrier and the reflective element. The support member has an electrical power connector, such as a ribbon cable, thereon adapted to be interconnected with an onboard power supply of the vehicle.

The power distributor can comprise a plurality of electrical leads corresponding to each of the plurality of functional elements of the vehicular mirror system. The plurality of functional elements are electrically independent of one another. One of the plurality of functional elements comprises a heater for the reflective element, which comprises an array of conductive elements which abut the reflective element. Another of the plurality of functional elements comprises a turn signal which abuts the reflective element. Another of the plurality of functional elements comprises a dimming device, such as an electrochromic device, for the reflective element.

The power distributor can comprise a planar member having a periphery in register with the periphery of at least one of the reflective element carrier and the reflective element. The power distributor can comprise at least one power lead interconnected to an electrical connector for operative interconnection of the power distributor to an onboard power supply of the vehicle.

The power distributor can also comprise a first power lead operatively interconnected to a heating element, wherein the heating element comprises an array of conductive material associated with the power distributor corresponding to an effective imaging area of the reflective element, and wherein the array of conductive material is operatively connected to the first power lead.

The power distributor can comprise a second power lead operatively interconnected to a turn signal, wherein the second power lead is operatively interconnected to the turn signal via an array of conductive material associated with the power distributor. The power distributor can also comprise a third power lead operatively interconnected to a reflective element dimming device, wherein the third power lead is operatively interconnected to the reflective element dimming device via an array of conductive material associated with the power distributor.

The electrical power connector can operatively interconnect the first, second, and third power leads with the onboard power supply of the vehicle.

DESCRIPTION OF EMBODIMENTS OF THE INVENTION

Figure 1:
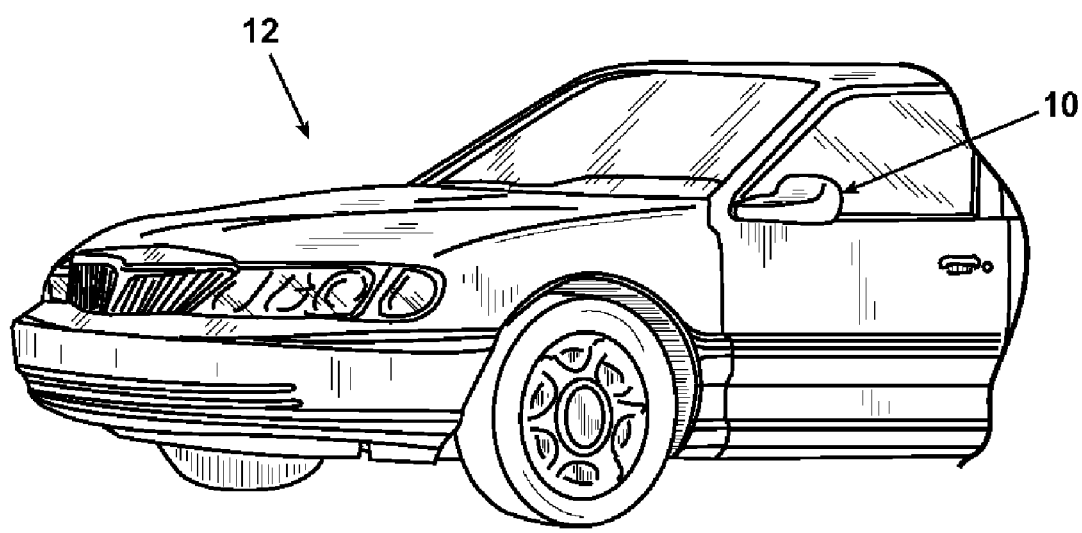
FIG. 1 is a partial perspective view of a vehicle having a rearview mirror system comprising a modular heater circuit according to the invention.
Figure 2:
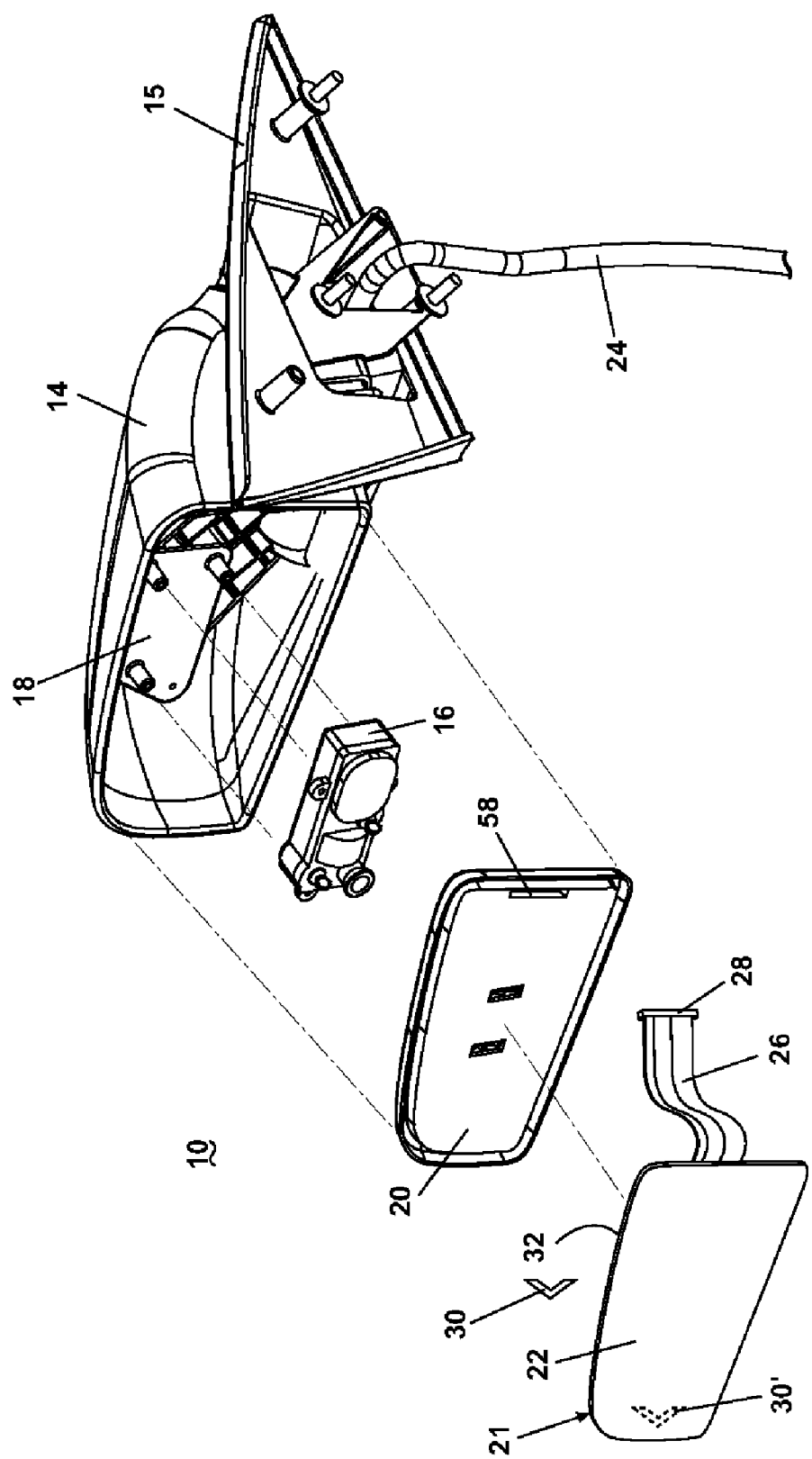
FIG. 2 is an exploded view of the rearview mirror system shown in FIG. 1 comprising a reflective element assembly and a mirror case.

Referring now to FIGS. 1 and 2, an external rearview mirror system 10 according to the invention is shown attached to a motor vehicle 12. In most respects, the external rearview mirror system 10 is similar to a conventional rearview mirror assembly, and comprises a shell 14 attached to a base 15 through which the rearview mirror system 10 is attached to the motor vehicle 12. The shell 14 encloses a tilt actuator assembly 16 mounted to a support frame 18, which is used to adjust the orientation of a reflective element carrier 20 about two perpendicular axes. The reflective element carrier 20 mounts a reflective element assembly 21. A wire harness 24 provides power and operational control from the vehicle power/control center to the rearview mirror system 10.

Figure 3:
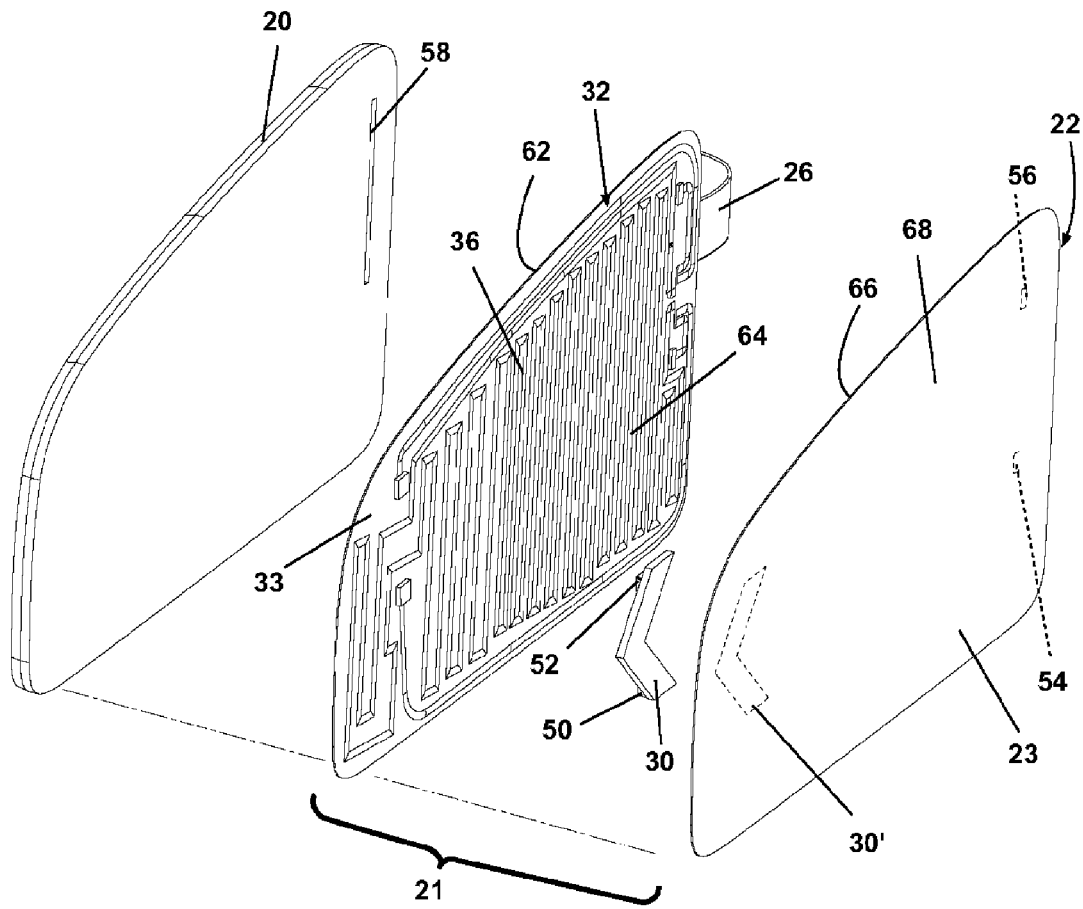
FIG. 3 is an exploded view of the reflective element assembly and mirror case shown in FIG. 2 comprising an integrated heater pad/power supply array.

Referring also to FIG. 3, the reflective element assembly 21 comprises a reflective element 22, and a power distributor 32 according to the invention, which is illustrated in exemplary form as an integrated heater pad and power supply array. The reflective element 22 comprises a plate-like support member 23 having a reverse face 66 and an obverse face 68. The reflective element 22 can comprise a generally conventional mirror comprising, for example, a coated glass or reflective polymer attached to the reverse face 66. The reverse face 66 of the reflective element 22 can also be positioned adjacent to a turn signal element 30 for turn signal indication, as hereinafter described.

As shown in the drawings the reflective element 22 can be provided with an optical region 30' through which light emitted from the turn signal element 30 can be displayed, typically to drivers located rearwardly of the vehicle on which the mirror system described herein is mounted. The optical region 30' can be any known light-transmitting region such as a transparent area, a translucent area, whether covered by a filter, optical mask and the like. It will also be understood that the optical region 30' can simply be an area on the reflective element 22 through which light from the turn signal element 30' emanates.

The turn signal element 30 is also provided with a turn signal power contact point 50 and a turn signal common contact point 52. The contact points 50, 52 are adapted for electrical connection with a positive terminal and a negative terminal of a power supply for activation of the turn signal element 30.

The reflective element 22 is provided with an electrochromic power contact point 54 and an electrochromic common contact point 56 attached to the reverse face 66 and adapted to energize an electrochromic mirror dimming feature incorporated into the reflective element 22.

The power distributor 32 comprising the integrated heater pad/power supply array comprises a planar support member 33 having a reverse face 62 and an obverse face 64. An array 36 of electrically-conductive tracings is carried on the obverse face 64 and comprises a plurality of discrete contact points for electrical connection of the array 36 with selected functional elements associated with the reflective element assembly 21, such as the turn signal element or the electrochromic mirror dimming element. Electrical power is provided to the power distributor 32 through a power supply harness 26 suitably interconnected with the support member 33. The power supply harness 26 preferably carries a single positive electrical power lead for electrical communication with a positive power portion of the array 36, and a single common power lead or grounded lead for electrical communication with a common portion of the array 36 in order to provide required power to the circuits comprising the selected functional elements, such as the turn signal element, the electrochromic mirror dimming element, and the heater element described herein.

As indicated previously herein, the power distributor 32 is illustrated as configured to incorporate a heater pad. However, other embodiments can be configured wherein the power distributor 32 does not include a heater pad (such as, for example, where the mirror system is not to be provided with a heater pad), and the power distribution is accomplished with the incorporation of a different functionality, such as electrochromic dimming, or a power distributor incorporating a pair of electrical contact bars only. Preferably, the power distributor 32 is configured for power distribution over a relatively large area of the support member 33 so that the electrical contact points along the power distributor 32 for the different functionalities are located at those functionalities and are not concentrated in a relatively limited area of the support member 33. A heater pad provides an effective integrated of such a distributed power supply and functionality.

Figure 4:
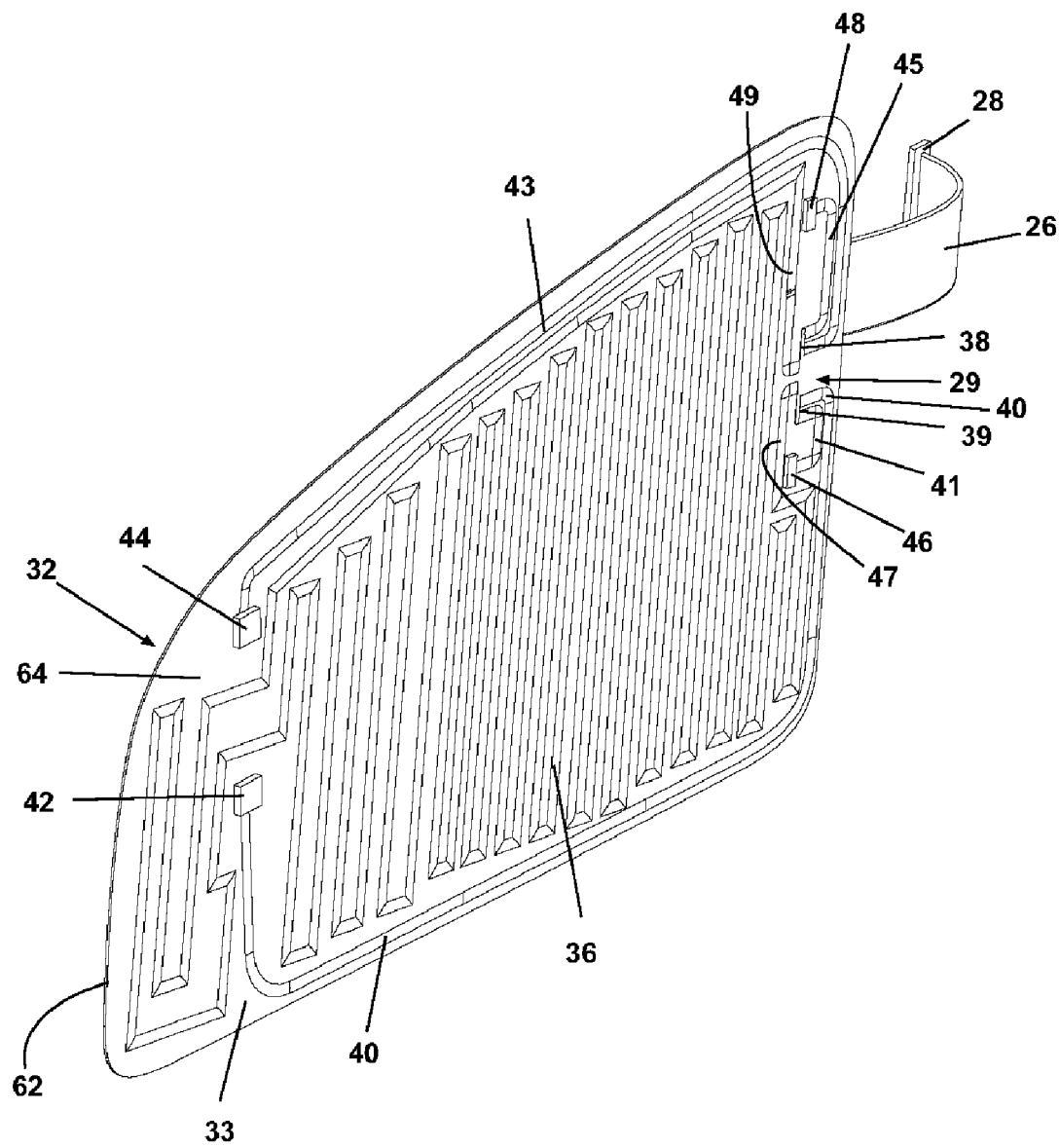
FIG. 4 is a close-up perspective view of the integrated heater pad/power supply array shown in FIG. 3.

As shown specifically in FIG. 4, the power distributor 32 comprises a power supply harness 26 extending from the reverse face 62 and operably connected in a generally well-known manner through the support member 33 to a module connection 29 on the obverse face 64. In addition to providing electrical power, the power supply harness 26 is adapted to provide operating control to the reflective element assembly 21. The power supply harness 26 terminates in a conventional plug connector 28 adapted for cooperative communication with the wire harness 24.

The module connection 29 is divided into a common lead 38 electrically connected to a turn signal common lead 43, an electrochromic common lead 45, and a heater common lead 49, and a power lead 39 electrically connected to a turn signal power lead 40, an electrochromic power lead 41, and a heater power lead 47. Electrically connected to the heater common lead 49 and the heater power lead 47 is a well-known heater tracing 36 incorporated into the obverse face 64 and adapted for defrosting and defogging the reflective element 22 when the integrated heater pad/power supply array 32 and the reflective element 22 are brought into operable communication.

The turn signal common lead 43 feeds a turn signal tracing 43 which terminates in a turn signal common contact 44, and an electrochromic common lead 45 terminates in an electrochromic common contact 48. Similarly, the turn signal power lead 40 feeds a turn signal power tracing 40 which terminates in a turn signal power contact 42. An electrochromic power lead 41 terminates in an electrochromic power contact 46.

The turn signal common contact 44 is adapted for electrical communication with the turn signal common contact point 52, and the turn signal power contact 42 is adapted for electrical communication with the turn signal power contact point 50. The electrochromic common contact 48 is adapted for electrical communication with the electrochromic common contact point 56, and the electrochromic power contact 46 is adapted for electrical communication with the electrochromic power contact point 54.

When the power distributor 32 is brought into aligned contact with the reflective element 22, the electrochromic common contact 48 will be brought into electrical communication with the electrochromic common contact point 56, and the electrochromic power contact 46 will be brought into electrical communication with the electrochromic power contact point 54, thereby providing power to the electrochromic mirror dimming element.

Similarly, the turn signal common contact 44 will be brought into electrical communication with the turn signal common contact point 52, and the turn signal power contact 42 will be brought into electrical communication with the turn signal power contact point 50, thereby providing electrical power to the turn signal element 30. Of course, the turn signal element 30 is brought into alignment with the optical region 30' on the reflective element during the mounting of these components to one another as well.

Figure 5:
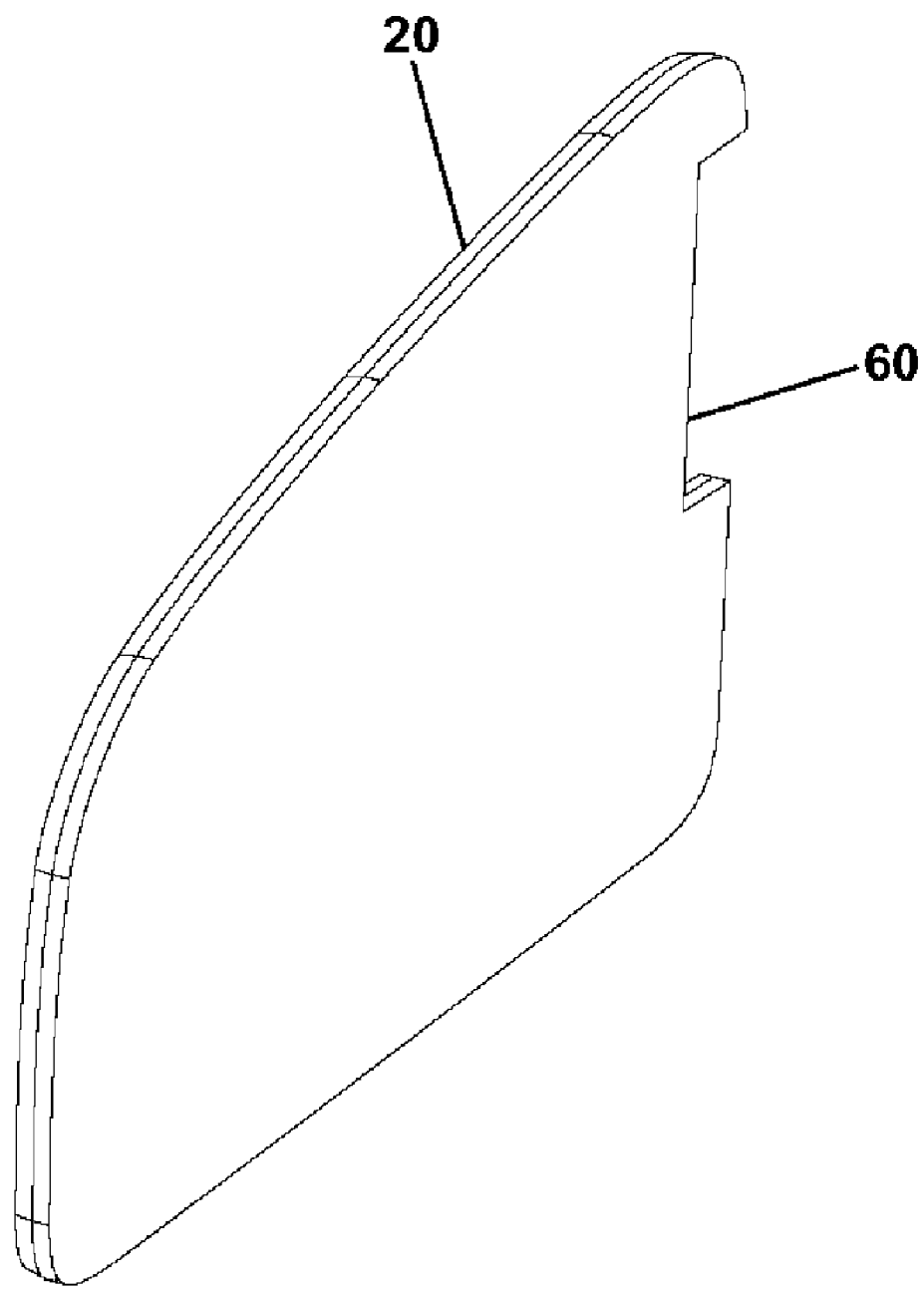
FIG. 5 is a perspective view of an alternate embodiment of the mirror case shown in FIG. 2.

The reflective element carrier 20 comprises a generally conventional reflective element carrier adapted to mount the reflective element assembly 21, provided with a power supply harness slot 58 aligned for mating cooperation with the power supply harness 26 so that, when the reflective element assembly 21 is mounted to the reflective element carrier 20, the power supply harness 26 can be inserted through the power supply harness slot 58 to be connected to the wire harness 24. As shown in FIG. 5, the reflective element carrier 20 can alternatively be provided with a power supply harness notch 60 rather than the power supply harness slot 58 to facilitate the connection of the power supply harness 26 through the reflective element carrier 20 to the wire harness 24.

Figure 6:
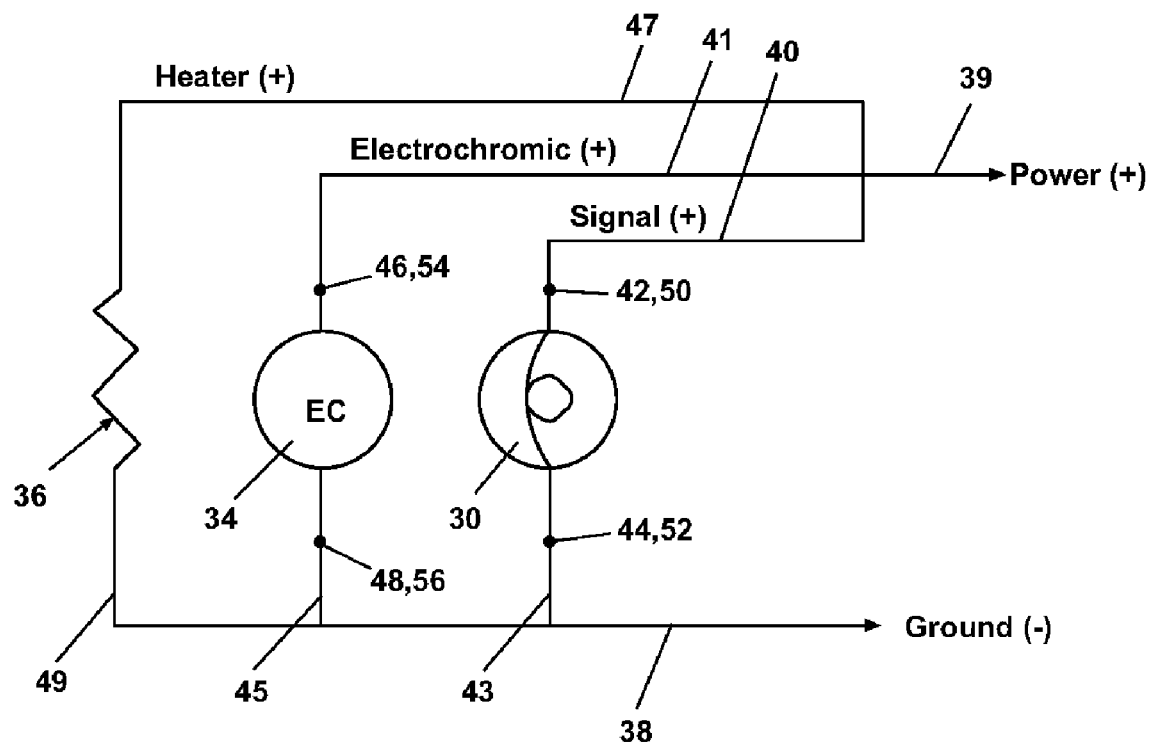
FIG. 6 is a schematic diagram of an electrical circuit for the rearview mirror system shown in FIG. 1.

FIG. 6 shows a schematic wiring diagram for the rearview mirror system 10 described herein. As shown in FIG. 6, the turn signal element 30, the electrochromic module 34, and the heater tracing 36 are each supplied by separate power leads 40, 41, 47 respectively, connected to a single power lead 39, and are all connected to a common or ground lead 38 through their respective common leads 43, 45, 49. The common and power contacts 42, 44, 46, 48, 50, 52, 54 and 56 are shown in FIG. 6 as well. As can be seen in FIG. 6, the mating sets of contact points that are brought into alignment during assembly of the vehicular mirror described herein are shown as matched pairs in FIG. 6: (42, 50) and (44, 52) for the turn signal element 30, and (46, 54) and (48, 56) for the electrochromic element 34. Since the heater element 36 has tracings which directly connect to the appropriate circuit components, no contact points are shown although contact points can be provided to the heater element 36 without departing from the scope of this invention.

The improved reflective element assembly described herein facilitates the assembly of the rearview mirror system by eliminating the multiple wire harnesses and plug-type connectors necessitated by the prior art assemblies to accommodate each functional element incorporated into the rearview mirror system. The heater pad, electrochromic dimming element, turn signal element, and other functional elements in the rearview mirror system can be readily integrated and interconnected with the primary wire harness to the rearview mirror system through a single plug connection which can be readily installed during assembly of the rearview mirror. The improved assembly will provide cost savings in reduced assembly time, and reduced misassembly of the complex prior art mirror system.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. A vehicular mirror system comprising:
    an exterior mirror assembly, said mirror assembly including a reflective element for providing a rearward view to an occupant of the vehicle, the reflective element comprising an electrochromic dimming element and at least one dimming element contact for providing electric power to the electrochromic dimming element;
    a support member for supporting the reflective element, the support member comprising at least a heater tracing for heating the reflective element and at least one selectively located electric power contact; and
    a power distributor coupled with the support member for distributing power from a single electrical power connector to the at least one selectively located electric power contact and the heater tracing;
    said power distributor comprising a plurality of electrical leads corresponding to each of the electrochromic dimming element and the heater tracing;
    wherein the at least one selectively located electric power contact is coupled with the at least one dimming element contact when the support member is brought into aligned contact with the reflective element so that power is selectively provided to the electrochromic mirror dimming element and the heater tracing.

2. A vehicular mirror system in accordance with claim 1, wherein the electrical power connector is adapted to be interconnected with an onboard power supply of the vehicle.

3. A vehicular mirror system in accordance with claim 2, wherein the electrical power connector comprises a ribbon cable.

4. A vehicular mirror system in accordance with claim 1, wherein the exterior mirror assembly further comprises a turn signal.

5. A vehicular mirror system in accordance with claim 1, wherein the heater tracing comprises an array of conductive elements which abut the reflective element.

6. A vehicular mirror system in accordance with claim 4, wherein the turn signal abuts the reflective element.

7. A vehicular mirror system in accordance with claim 1, wherein the power distributor comprises a planar member having a periphery in register with the periphery of at least one of a reflective element carrier and the reflective element.

8. A vehicular mirror system in accordance with claim 1, wherein the heater tracing comprises an array of conductive material associated with the power distributor and corresponding to an effective imaging area of the reflective element, and wherein the array of conductive material is operatively connected to a first one of the plurality of electrical leads.

9. A vehicular mirror system in accordance with claim 4, wherein the power distributor comprises a second one of the plurality of electrical leads operatively interconnected to the turn signal.

10. A vehicular mirror system in accordance with claim 9, wherein the second one of the plurality of electrical leads is operatively interconnected to the turn signal via an array of conductive material associated with the power distributor.

11. A vehicular mirror system in accordance with claim 9, wherein the power distributor comprises a third one of the plurality of electrical leads operatively interconnected to the electrochromic dimming element.

12. A vehicular mirror system in accordance with claim 11, wherein the third one of the plurality of electrical leads is operatively interconnected to the electrochromic dimming element via an array of conductive material associated with the power distributor.

13. A vehicular mirror system in accordance with claim 11, wherein the electrical power connector operatively interconnects the first, second, and third electrical leads with the onboard power supply of the vehicle.

* * * * *